United States Patent Office 3,506,666
Patented Apr. 14, 1970

3,506,666
1-METHYL-1-(SUBSTITUTED)-4-(PENTACHLORO-PHENYL)PIPERAZINIUM SALTS
Elton K. Morris, Midland, Mich., assignor to The Dow Chemical Company, Midland, Mich., a corporation of Delaware
No Drawing. Filed Dec. 5, 1966, Ser. No. 598,926
Int. Cl. C07d 51/70
U.S. Cl. 260—268     5 Claims

ABSTRACT OF THE DISCLOSURE 1-methyl-1-(substituted)-4-(pentachlorophenyl) - piperazinium salts corresponding to one of the formulas

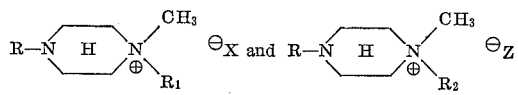

wherein R represents pentachlorophenyl, $R_1$ represents allyl or propynyl, $R_2$ represents alkyl, halolower alkyl, cyanomethyl, hydroxy lower alkyl, benzyl or (ethoxycarbonyl)methyl, X is sulfate, nitrate, chloride, bromide, iodide or alkanoate and Z is X or bromochloroiodate, dichloroiodate or tetrachloroiodate. The compounds are useful for the control of algae, bacteria and fungi.

The present invention is directed to novel chemical compounds and particularly to the 1-methyl-1-(substituted)-4-(pentachlorophenyl)piperazinium salts corresponding to one of the formulas

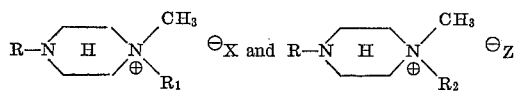

In the formulas set forth in the following specification and claims R represents pentachlorophenyl, $R_1$ represents allyl or propynyl, $R_2$ represents alkyl, halo lower alkyl, cyanomethyl, hydroxy lower alkyl, benzyl or (ethoxycarbonyl)methyl, X is sulfate, nitrate, chloride, bromide, iodide or alkanoate, and Z is X or bromochloroiodate, dichloroiodate, or tetrachloroiodate. As employed in the present specification and claims "alkyl" refers to straight or branched chain alkyl groups containing from 1 to 18 carbon atoms, inclusive, "lower alkyl" represents alkyl moieties containing from 1 to 6 carbon atoms, inclusive, "alkanoate" represents the anion of a saturated aliphatic carboxylic acid containing from 1 to 4 carbon atoms and "halo" represents chloro, bromo, iodo or fluoro. Representative alkyl moieties include methyl, isopropyl, isobutyl, sec.-butyl, 4-methylheptyl, 6-diethyldecyl, decyl octadecyl, 10-ethylhexadecyl, 10-ethyldodecyl, dodecyl, nonyl, octyl, 6-methyloctyl, 2-methylheptyl, and 2-ethylhexadecyl. Representative alkanoate moieties include formate, acetate, propionate and butyrate. The compounds of the present invention are crystalline solids which are of varying solubility in water and in common organic solvents. These compounds have been found to be useful as pesticides for the control of various bacterial, algae, and fungal pests. Representative pests include Staphylococcus aureus, Pseudomonas aeroginosa, Candida pelliculosa, and Bacillus subtilis.

The new 1-methyl-1-(substituted)-4-(pentachlorophenyl)piperazinium salts of the present invention wherein ⊖X and ⊖Z represent bromide, chloride or iodide are prepared by reacting 1-methyl - 4 - (pentachlorophenyl) piperazine with a substituted halide compound corresponding to the formula $R_1X_1$ and $R_2X_1$ wherein $X_1$ represents chloro, bromo or iodo. The compounds thus produced correspond to the formulae

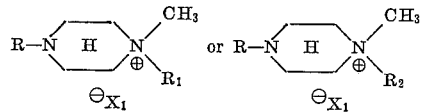

and are hereinafter referred to as 1-methyl-1-($R_1$ or $R_2$-substituted) - 4-(pentachlorophenyl)piperazinium $X_1$-halides. Representative substituted halides include allyl chloride, 1-bromo-2-methylpropane, 2-iodopentane, 1-iodo-6-butyl-decane, 1-chlorohexadecane, 1-iodoheptane, 1 - chlorohexane, 1 - bromobutane, chloromethane, 2-iodoethane, 1-bromopropane, 1,2 - dichloroethane, 4-bromo-1-pentanol, 6-iodo-1-hexanol, 1-chloro-4-fluorobutane, 1-bromo-3-fluoropropane, 3-iodo-1-propanol, 2-bromoethanol, 4-chloro-1-butanol, 2-bromo-1-propanol, 6-chloro-1-hexanol, 1-iodo-5-fluoropentane, 1,6-dibromohexane, 1,3-diiodopropane, and chloroacetonitrile.

In preparing these 1-methyl-1-($R_1$- or $R_2$-substituted)-4-(pentachlorophenyl)piperazinium-X-1-halides, the reactants are contacted in an inert organic liquid as reaction medium. The reaction proceeds readily with the production of the desired 1-methyl-1-($R_1$- or $R_2$-substituted) - 4 - (pentachlorophenyl)piperazinium-X-1-halide product at temperatures between 0° and 200° C. When $R_2$ represents an alkyl group containing from 6 to 18 carbon atoms, inclusive, and $X_1$ represents chloride, reaction temperatures of from 50° to 150° C. are preferred. When $X_1$ represents bromide and $R_2$ represents alkyl groups containing from 6 to 18 carbon atoms, inclusive, it is preferred to employ reaction temperatures between 80° and 150° C. When employing the alkyl iodides corresponding to the Formula $R_2I$ wherein $R_2$ represents an alkyl group containing from 6 to 18 carbon atoms, inclusive, reaction temperatures of from 0° and 80° C. are preferred.

The proportions of the reactants to be employed are not critical, some of the desired product being formed upon contacting of the reactants in any proportions. However, the reaction consumes the reactants in substantially equimolar proportions and the use of the $X_1$ substituted halide and the 1-methyl-4-(pentachlorophenyl)-piperazine in such proportions is preferred. In such operations, the reactants are contacted in any order or fashion in an inert organic solvent such as benzene, acetone, xylene, hexane, ethanol, methylene dichloride or dioxane.

Following the contacting of the reactants, the reaction mixture is maintained at a temperature within the desired temperature range for a period of from a few hours to several days. In a convenient procedure, the reaction mixture is maintained at the boiling temperature of the reaction mixture until the halide ion concentration becomes constant. In some cases, the desired product precipitates in the reaction mixture during the heating period and such precipitated product is easily isolated from the reaction mixture by filtration. In those cases where the product does not precipitate from the reaction mixture, the product can be isolated by concentrating the reaction mixture to initiate the precipitation of the product and subsequently filtering the concentrated mixture to remove the precipitated product or by evaporating of the low boiling constituents from the reaction mixture to obtain the product as a solid residue.

The 1-methyl-1-($R_1$- or $R_2$-substituted)-4-(pentachlorophenyl)piperazinium bromides and chlorides of the present invention can be prepared in an alternative procedure. In such a method, the 1-methyl-1-($R_1$- or $R_2$-substituted)-4-(pentachlorophenyl)piperazinium iodide is reacted with a silver bromide or silver chloride to produce the corresponding bromide or chloride with silver iodide as a by-product. Similarly the 1-methyl-1-($R_1$- or $R_2$-substituted)-4-(pentachlorophenyl)piperazinium bromide is reacted with silver chloride to produce the corresponding chloride. The reaction is carried out in the presence of a liquid reaction medium such as water, ethanol, or methanol and at a temperature between about 0° and the boiling point of the reaction mixture to produce the desired product and the silver halide by-product. In a preferred procedure the reaction is carried out at or near the boiling temperature of the reaction mixture. In a convenient procedure, the reaction mixture is maintained at the reaction temperature until there is a substantial cessation in the precipitation of the silver halide by-product of reaction. In carrying out such a halogen exchange reaction, good results are obtained by employing the silver halide in a molar amount slightly in excess of the molar amount of 1-methyl-1-($R_1$- or $R_2$-substituted)-4-(pentachlorophenyl)piperazinium $X_1$-iodide or bromide to be converted. Following the reaction, the desired product is isolated from the reaction mixture by such conventional procedures as filtering the reaction mixture to remove the by-product silver halide and subsequently cooling the filtrate to induce crystallization of the desired product from the filtered reaction mixture. In an alternate procedure the low boiling constituents are evaporated or distilled off to obtain the desired product as a solid residue. In another procedure, the reaction mixture is concentrated to facilitate crystallization and precipitation of the desired product with subsequent separation of the precipitated solid product by filtration.

Representative 1-methyl-1-($R_1$- or $R_2$-substituted)-4-(pentachlorophenyl)piperazinium iodides and bromides employed as starting material in such halogen exchanges include 1-methyl-1-butyl-4-(pentachlorophenyl)piperazinium iodide,
1,1-dimethyl-4-(pentachlorophenyl)piperazinium iodide,
1-methyl-1-(2-hydroxyethyl)-4-(pentachlorophenyl)-piperazinium bromide,
1-methyl-1-decyl-4-(pentachlorophenyl)piperazinium bromide,
1-methyl-1-(4-hydroxybutyl)-4-(pentachlorophenyl)piperazinium iodide,
1-methyl-1-allyl-4-(pentachlorophenyl)piperazinium iodide,
1-methyl-1-benzyl-4-(pentachlorophenyl)piperazinium bromide,
1-methyl-1-(3-fluoropropyl)-4-(pentachlorophenyl)piperazinium iodide,
1-methyl-1-(cyanomethyl)-4-(pentachlorophenyl)piperazinium bromide,
1-methyl-1-(2-chloroethyl)-4-(pentachlorophenyl)-piperazinium bromide,
1-methyl-1-(3-hydroxypropyl)-4-(pentachlorophenyl)piperazinium iodide, and
1-methyl-1-(6-hydroxyhexyl)-4-(pentachlorophenyl)piperazinium bromide.

The 1-methyl-1-(substituted)-4-(pentachlorophenyl)piperazinium salts of the present invention corresponding to the formulas

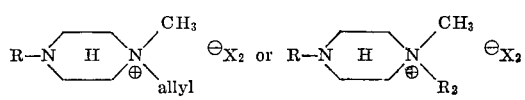

wherein $X_2$ represents sulfate, nitrate, or alkanoate are prepared by a method wherein a 1-methyl-1-(substituted)-4-(pentachlorophenyl)piperazinium chloride, bromide or iodide, conveniently prepared as described herein, is reacted with silver hydroxide to prepare a piperazinium hydroxide intermediate corresponding to the formula

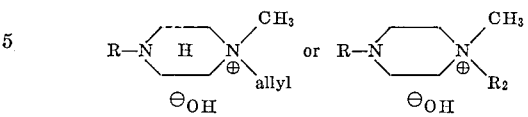

The piperazinium hydroxide is thereafter reacted with sulfuric acid, nitric acid, formic acid, acetic acid, propionic acid, or butyric acid to produce the desired salt.

In such a procedure, a piperazinium chloride, bromide or iodide salt is contacted with silver oxide to produce the 1-methyl-1-(substituted)-4-(pentachlorophenyl)-piperazinium hydroxide. The reaction proceeds readily in water as reaction medium and at a temperature of from 0° C. to 100° C. with the production of the desired piperazinium hydroxide and silver halide reaction by-product. Optimum yields of the desired piperazinium hydroxide are obtained when the silver oxide and piperazinium halide are employed in substantially equimolar proportions or when the silver oxide is employed in a molar amount slightly in excess of the molar amount of piperazinium halide employed.

In carrying out the production of the piperazinium hydroxide, the piperazinium halide and silver oxide are contacted in water as the reaction medium. The temperature of the reaction mixture is thereafter maintained in the desired temperature range until there is a substantial cessation in the precipitation of the silver halide reaction by-product. Thereafter, the reaction mixture is filtered to remove the silver halide by-product and the acid producing the desired salt is added to the reaction mixture containing the 1-methyl-1-(substituted)-(pentachlorophenyl)piperazinium hydroxide. The addition of the acid to the filtered pentachlorophenyl piperazinium hydroxide solution is carried out at temperatures of from 0° C. to 100° C. Good yields of the desired salt are obtained when the acid and pentachlorophenyl piperazinium hydroxide are contacted in at least equimolar proportions. However, in a preferred procedure, the appropriate acid is employed in a molar amount slightly in excess (about 5 percent) of the molar amount of pentachlorophenyl piperazinium hydroxide. The desired salt product is thereafter separated from the reaction mixture by a convenient procedure such as heating the reaction mixture to remove the low boiling constituents and obtain the desired product as a solid residue.

Representative 1-methyl-1-(substituted)-4-(pentachlorophenyl)piperazinium hydroxide intermediates include 1-methyl-1-(isopropyl)-4-(pentachlorophenyl)piperazinium hydroxide,
1-methyl-1-(2-methyl-5-chloropentyl)-4-(pentachlorophenyl)piperazinium hydroxide,
1-methyl-1-(3-ethylhexyl)-4-(pentachlorophenyl)piperazinium hydroxide,
1-methyl-1-benzyl-4-(pentachlorophenyl)piperazinium hydroxide,
1-methyl-1-(cyanomethyl)-4-(pentachlorophenyl)piperazinium hydroxide,
1,1-dimethyl-4-(pentachlorophenyl)piperazinium hydroxide,
1-methyl-1-allyl-4-(pentachlorophenyl)piperizinium hydroxide,
1-methyl-1-(2-chloroethyl)-4-(pentachlorophenyl)piperazinium hydroxide,
1-methyl-1-(2-chloroethyl)-4-pentachlorophenyl)piperazinium hydroxide and
1-methyl-1-(hexadecyl)-4-(pentachlorophenyl)piperazinium hydroxide.

The 1-methyl - 1 - propynyl-4-(pentachlorophenyl)-piperazinium salts having the formula

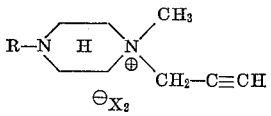

wherein $X_2$ represents sulfate, nitrate, or alkanoate are prepared by reacting a 1 - methyl-1-propynyl-4-(pentachlorophenyl)piperazinium bromide, iodide or chloride, conveniently prepared as previously described, with the silver salt containing the anion represented by $X_2$. Representative silver salts include silver sulfate, silver nitrate, silver acetate, silver propionate, silver formate and silver butyrate. In carrying out this method, the 1-methyl-1-propynyl - 4 - (pentachlorophenyl)piperazinium chloride, bromide or iodide is dispersed in water or a water-methanol mixture. An equimolar amount of the appropriate silver salt and a small amount of the corresponding acid is thereafter added to the aqueous dispersion and the temperature of the resulting reaction mixture maintained at a temperature of between 50° and 100° C. until there is a substantial cessation in the precipitation of the silver halide by-product. Following the heating period the reaction mixture is filtered while hot to remove the silver halide by-product. The filtered reaction mixture is then cooled or condensed to initiate the precipitation of the desired product and the precipitated product thereafter isolated by filtration, decantation or centrifugation.

The 1 - methyl - 1 - ($R_2$-substituted)-4-(pentachlorophenyl)piperazinium bromochloroiodates of the present invention are prepared by reacting, in the presence of acetic acid, iodobromide and a 1 - methyl-1-($R_2$-substituted)-4-(pentachlorophenyl)piperazinium chloride compound of the present invention corresponding to the formula

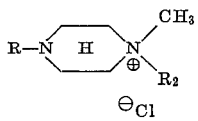

The reaction proceeds readily with the production of the desired bromochloroiodate at temperatures of from 20° to 40° C. In such a procedure, good yields of the desired product are obtained when the iodobromide and 1-methyl-1 - (substituted) - 4 - (pentachlorophenyl)piperazinium chloride are contacted together in substantially equimolar proportions. The reaction mixture is maintained in the reaction temperature range until there is substantial cessation in the precipitation of the desired bromochloroiodate. Thereafter, the desired solid product can be separated from the reaction mixtures by such conventional procedures as filtration, centrifugation or decantation. Representative bromochloroiodates thus prepared include 1-methyl-1-hexyl-4-(pentachlorophenyl)piperazinium bromochloroiodate,
1-methyl-1-(3-ethyl-5-heptyl)-4-(pentachlorophenyl)piperazinium bromochloroiodate,
1,1-dimethyl-4-(pentachlorophenyl)piperazinium bromochloroiodate,
1-methyl-1-(octadecyl)-4-(pentachlorophenyl)piperazinium bromochloroiodate,
1-methyl-1-(4-hydroxybutyl)-4-pentachlorophenyl)piperazinium bromochloroiodate,
1-methyl-1-(2-hydroxyethyl)-4-(pentachlorophenyl)piperazinium bromochloroiodate, and
1-methyl-1-(ethylcarboxymethyl)-4-(pentachlorophenyl)piperazinium bromochloroiodate.

The 1 - methyl - 1 - (substituted) - 4 - (pentachlorophenyl)piperazinium dichloroiodate compounds of the present invention are prepared by reacting iodochloride and a 1-methyl-1-(substituted)-4-(pentachlorophenyl)piperazinium chloride corresponding to the formula

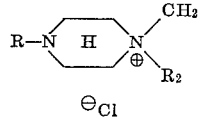

The reaction is carried out in glacial acetic acid as the reaction medium and at a temperature of from 15° to 35° C. and preferably at a temperature below 35° C. The temperature of the reaction mixture is maintained within the desired temperature range until there is a substantial cessation in the precipitation of the desired dichloroiodate product. Good yields of the desired dichloroiodate salt are obtained when the reactants are contacted in substantially equimolar proportions. Following the reaction period, the precipitated solid product can be separated by conventional procedures such as filtration, decantation or centrifugation. Representative 1-methyl-1-(substituted)-4-(pentachlorophenyl)piperazinium dichloroiodates include:

1-methyl-1-(octyl)-4-(pentachlorophenyl)-piperazinium dichloroiodate,
1-methyl-1-(2-hydroxyethyl)-4-(pentachlorophenyl) piperazinium dichloroiodate,
1-methyl-1-(3-fluoropropyl)-4-(pentachlorophenyl) piperazinium dichloroiodate,
1-methyl-1-cyanomethyl-4-(pentachlorophenyl) piperazinium dichloroiodate, and
1-methyl-1-(bromoethyl)-4-(pentachlorophenyl) piperazinium dichloroiodate.

The 1-methyl-1-(substituted) - 4 - (pentachlorophenyl) piperazinium tetrachloroiodate compounds of the present invention are prepared by reacting chlorine gas with a 1 - methyl - 1 - (substituted) - 4 - (pentachlorophenyl) piperazinium iodide compound corresponding to the formula

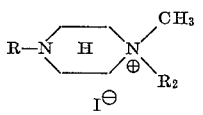

The reaction is carried out in the glacial acetic acid as reaction medium. The reaction proceeds readily at temperatures between 10° C. and 30° C. and preferably at temperatures below 30° C. with the production of the desired tetrachloroiodate compound. The temperature of the reaction mixture is maintained within the reaction temperature range until there is a substantial cessation in the precipitation of the tetrachloroiodate compound. Good yields of the desired product are obtained when a slight excess of chlorine is employed with respect to the piperazinium iodide starting material. The precipitated solid product can be collected by such conventional procedures as already set forth.

In addition to the method previously mentioned, the 1 - methyl-1-(cyanomethyl)-4-(pentachlorophenyl)piperazinium salt compounds of the present invention can be prepared by reacting together an alkali metal 4-(pentachlorophenyl)piperazinyl methane sulfonate and alkali metal cyanide to produce an intermediate 1-cyanomethyl-4-(pentachlorophenyl)piperazine which is then reacted with methyl iodide to produce the 1-methyl-1-cyanomethyl-4-(pentachlorophenyl)piperazinium iodide. The piperazinium iodide can then be converted to the bromide, chloride, bromochloroiodate, dichloroiodate and tetrachloroiodate in the manner as previously described.

In this alternative method of preparing the 1-cyanomethyl-4-(pentachlorophenyl)piperazine compounds, the reaction between the alkali metal-4-(pentachlorophenyl)-piperazinyl methane sulfonate and the alkali metal cyanide proceeds readily at temperatures between 20° and 100° C. Representative alkali metals include sodium and potassium. The proportions of the reactants are not critical, some of the desired product being produced when combining the reactants in any proportions. However, the reaction consumes the reactants in equimolar proportions and the use of such proportions is desirable. In carrying out the reaction, the reactants are contacted together in any order or fashion in water or other polar solvent as the reaction medium, and the resulting reaction mixture maintained at a temperature within the desired temperature range for from several hours to several days. During the reaction period solid 1-cyanomethyl-4-(pentachlorophenyl)piperazine product precipitates in the reaction mixture and is then isolated from the reaction mixture by conventional procedures. The 1-cyanomethyl-4-(pentachlorophenyl)piperazine is then reacted with methyl iodide in the presence of an organic liquid such as benzene or acetone, as reaction medium to produce the 1-methyl-1-cyanomethyl-4-(pentachlorophenyl)piperazinium iodide. Good yields of the piperazinium iodide are obtained when the 1-cyanomethyl-4-(pentachlorophenyl)piperazine and methyl iodide are contacted in substantially equimolar proportions. The reaction proceeds readily at a temperature between about 25° C. and the boiling point of the reaction mixture with the reaction mixture being maintained at a temperature within the desired temperature range until there is a substantial cessation in the production of iodide ions. This product is then separated from the reaction mixture by conventional procedures as previously set forth.

The new compounds of the present invention prepared as herein described can be employed in pesticidal applications or further purified by washing or recrystallization before being so employed.

The following examples are merely illustrative and are not intended to be limiting.

EXAMPLE 1

1 - methyl - 4 - (pentachlorophenyl)piperazine (43 grams; 0.12 mole) was dissolved in 100 milliliters of toluene. Iodomethane (36 grams; 0.24 mole) was added to this solution and the resulting mixture was heated on the steam bath for 20 hours. Following the heating period, the 1,1 - dimethyl - 4 - (pentachlorophenyl)piperazinium iodide compound, which precipitated in the reaction mixture during the heating period, was removed by filtration and dried.

This 1,1 - dimethyl - 4 - (pentachlorophenyl)piperazinium iodide product (48.27 grams; 0.093 mole) was dissolved in 1 liter of methanol and silver chloride (13.5 grams; 0.94 mole) added to the solution. The resultant mixture was heated at the boiling temperature and under reflux with stirring for 1 hour. During the heating period, silver iodide of reaction precipitated in the reaction mixture. Upon the cessation in the precipitation of the silver iodide, the hot reaction mixture was filtered to remove the silver iodide and the filtrate concentrated on the steam bath. The concentrated filtrate was heated at the boiling temperature and benzene added thereto to initiate the precipitation of the desired product, and thereafter allowed to stand at room temperature until the precipitation stopped. The precipitated 1,1-dimethyl-4-(pentachlorophenyl)piperazinium chloride product was separated from the reaction mixture by filtration, dried overnight in vacuo at 80° C. and found to melt at 275.5° to 276° C., with decomposition.

EXAMPLE 2

Sodium 4-pentachlorophenyl piperazinyl methane sulfonate (45 grams; 0.1 mole) and potassium cyanide (7.2 grams; 0.11 mole) were dispersed in 250 milliliters of water and the resulting mixture heated and stirred at the boiling temperature and under reflux for 1 hour. Following the heating period, the reaction mixture was allowed to stand at room temperature for 3 days. During this period, the 1 - cyanomethyl - 4 - (pentachlorophenyl)-piperazine product precipitated as a crystalline solid which was separated from the reaction mixture by filtration. The 1 - cyanomethyl - 4 - (pentachlorophenyl)piperazine thus prepared was dissolved in benzene and methyl iodide (28 grams; 0.2 mole) added thereto. The mixture thus formed was allowed to stand overnight at room temperature during which time, the 1 - methyl-1-cyanomethyl-4-(pentachlorophenyl)piperazinium iodide product precipitated in the reaction mixture as a crystalline solid. The solid iodide product was collected by filtration, suspended in hot methanol (1 liter) and silver chloride added thereto. The reaction mixture thus formed was heated at the boiling temperature with stirring for 15 minutes and then allowed to cool to room temperature with the stirring being continued for another 45 minutes. The solid silver iodide which precipitated during the reaction was removed by filtration and the filtrate evaporated to dryness leaving a solid residue which was recrystallized from a benzene-methanol solution. The recrystallized 1-methyl-1-cyanomethyl - 4 - pentachlorophenyl)piperazinium chloride was found to melt at about 233° C.

EXAMPLE 3

1,1 - dimethyl - 4 - (pentachlorophenyl)piperazinium iodide (10 grams) was dispersed in 24 milliliters of acetic acid. Chlorine gas was then bubbled through the reaction mixture until a slight excess had been employed. Following the chlorination, carbon tetrachloride was added to the reaction mixture to precipitate 1,1-dimethyl-4-(pentachlorophenyl)piperazinium tetrachloroiodate product as a crystalline solid.

EXAMPLE 4

1,1 - dimethyl - 4 - (pentachlorophenyl)piperazinium chloride (10 grams) was dispersed in 25 to 30 milliliters of acetic acid. A solution of iodochloride (4.08 grams; 0.0251 mole) was dispersed in 10 milliliters of acetic acid, and the resultant solution added slowly, portionwise, to the piperazinium chloride-acetic acid mixture. Following contacting of the reactants, 100 milliliters of carbon tetrachloride was added to the reaction mixture to insure the precipitation of the desired product. Thereafter, the 1,1-dimethyl - 4 - (pentachlorophenyl)piperazinium dichloroiodate product was separated by filtration and air dried.

EXAMPLE 5

1,1 - dimethyl - 4 - (pentachlorophenyl)piperazine chloride (10 grams; .0233 mole) was dispersed in glacial acetic acid and a solution of iodobromide (5.19 grams; 0.0251 mole) dissolved in glacial acetic acid was added thereto slowly portionwise. During the addition of these reactants the desired product began to precipitate as a crystalline solid. On completion of the reaction, the reaction mixture was diluted with carbon tetrachloride to insure complete precipitation of the desired 1,1-dimethyl-4 - (pentachlorophenyl)piperazinium bromochloroiodate product.

EXAMPLE 6

1 - methyl - 4 - (pentachlorophenyl)piperazine (78 grams; 0.23 mole) and anhydrous ethylene chlorohydrin (37 grams; 0.4 mole) were dispersed in 200 milliliters of toluene. The reaction mixture thus prepared was heated on the steam bath for 24 hours. During the heating period, 1 - methyl - 1 - (2-hydroxyethyl)-4-(pentachlorophenyl)piperazinium chloride precipitated in the reaction mixture as a crystalline solid which was separated from the reaction mixture by filtration. The filtrate thus obtained was heated on the steam bath for an additional 7 days to obtain additional solid product. The product obtained from the additional heating and the original product was combined and recrystallized from methanol to give a 1 - methyl - 1 - (2-hydroxyethyl)-4-(pentachlorophenyl)piperazinium chloride product melting at 285°–285.5° C.

EXAMPLE 7

1-methyl-4-(pentachlorophenyl)piperazine (70 grams; 0.2 mole) and propargyl bromide (48 grams; 0.4 mole) were dispersed in 200 milliliters of toluene. The reaction mixture thus formed was heated on the steam bath for 20 hours. During the heating period the solid 1-methyl-1-(2 - propynyl)-4-(pentachlorophenyl)piperazinium bromide product precipitated in the reaction mixture. This product was separated by filtration, washed with toluene and dried. The 1-methyl-1-(2-propynyl)-4-(pentachlorophenyl)piperazinium bromide thus formed (94 grams; 0.2 mole) was suspended in hot methanol (2 liters) and silver chloride (86 grams; 0.6 mole) added thereto. Upon addition of the silver chloride, silver bromide began to precipitate in the reaction mixture. The reaction mixture was heated on the steam bath with stirring for 15 minutes, removed from the steam bath and the stirring continued as a reaction mixture cooled to room temperature. The precipitated silver bromide was removed by filtration, washed with methanol, the methanol wash liquors added to the filtrate and the mixture evaporated to dryness to obtain a solid residue. The solid residue was crystallized from methanol-benzene to yield 1-methyl-1-(2 - propynyl)-4-(pentachlorophenyl)piperazinium chloride melting at 163.5–164° C. with decomposition.

EXAMPLE 8

1-methyl-4-(pentachlorophenyl)piperazine (74 grams; 0.21 mole) and iodohexane (89 grams; 0.42 mole) were dispersed in 200 milliliters of toluene. The resulting mixture was heated on the steam bath for 27 hours. Following the heating period, the solid 1-methyl-1-hexyl-4-(pentachlorophenyl)piperazinium iodide product which formed during the heating period was separated by filtration. The filtrate was thereafter diluted with 500 milliliters of toluene, heated at the boiling temperature and under reflux for 7 hours and thereafter maintained at a temperature just below the boiling temperature for about 15 hours. Following the heating period, the dilute filtrate was filtered to remove the precipitated product. This product was then washed and combined with the previously obtained product. The 1-methyl-1-hexyl-4-(pentachlorophenyl)piperazinium iodide thus prepared (73.7 grams; 0.156 mole) was dissolved in 1 liter of methanol. Silver chloride (67 grams; 0.468 mole) was added to the reaction mixture and the resulting mixture heated at the boiling temperature and stirred for 15 minutes. The reaction mixture was removed from the heat and stirred continuously while being allowed to cool to room temperature. The silver iodide which had precipitated in the reaction mixture during the heating period was separated by filtration and the filtrate evaporated to dryness to obtain a solid residue. This residue was dissolved in methanol and benzene added to the methanol solution. The resulting mixture was boiled until there was a substantial cessation in the precipitation of solid product. Following the boiling period, the reaction mixture was cooled to room temperature and the solid product separated by filtration, recrystallized from a benzene-methanol solution, washed with benzene and dried to give a 1-methyl-1-hexyl-4-(pentachlorophenyl)piperazinium chloride product melting at 258° C.

In a similar fashion the following products of the present invention were prepared:

1-methyl - 1-octadecyl-4-(pentachlorophenyl)piperazinium chloride (melting at 242–243° C.) was prepared by reacting 1 - methyl-4-(pentachlorophenyl)piperazine and 1-iodo-octadecane to prepare the 1-methyl-1-octadecyl-4-(pentachlorophenyl)piperazinium iodide which was then reacted with silver chloride to produce the piperazinium chloride salt.

1-methyl-1-(2 - fluoroethyl) - 4 - (pentachlorophenyl)-piperazinium chloride (melting at 261–262° C.) was prepared by reacting 1-methyl-4-(pentachlorophenyl)piperazine and 1-bromo-2-fluoroethane to prepare the 1-methyl-1-(2-fluoroethyl)-4-(pentachlorophenyl)piperazinium bromide which was then reacted with silver chloride to produce the piperazinium chloride salt.

1-methyl - 1 - allyl-4-(pentachlorophenyl)piperazinium chloride (melting at 257.5–258° C.) was prepared by reacting together 1-methyl - 4 - (pentachlorophenyl)piperazine and allyl chloride.

EXAMPLE 9

1 - methyl-1-butyl-4-(pentachlorophenyl)piperazinium bromide (243.7 grams; 0.5 mole) and silver oxide (173.7 grams; 0.75 mole) are added to 1 liter of water. The resulting reaction mixture is maintained at a temperature of 80° C. for 24 hours. During the reaction period the solid silver bromide precipitates in the reaction mixture. Following the reaction period, the silver bromide is removed from the reaction period by filtration. Thereafter, a methanolic solution of sulfuric acid (0.5 mole) is added to the filtered reaction mixture with stirring. The reaction mixture thus prepared is allowed to remain at room temperature for 18 hours. Following this period the reaction mixture is subjected to evaporation to obtain the 1-methyl-1-butyl-4-(pentachlorophenyl)piperazinium sulfate (molecular weight 501.61) as a solid residue.

EXAMPLE 10

1-methyl-4-(pentachlorophenyl)piperazine (50 grams; 0.14 mole) and 3-iodopropene (48 grams; 0.28 mole) were dispersed in 200 milliliters of toluene. The reaction mixture thus prepared was heated on the steam bath whereupon the crystalline solid 1-methyl-1-allyl-4-(pentachlorophenyl)piperazinium iodide began to precipitate immediately. The mixture was heated on the steam bath overnight and thereafter filtered to separate crystalline solid product. This 1-methyl-1-allyl-4-(pentachlorophenyl)piperazinium iodide product was then washed with benzene, dried and dissolved in 1.5 liters of methanol. The methanol solution was heated to boiling and silver chloride (42 grams) added. Following the addition of the silver chloride the reaction mixture was heated at the boiling temperature with stirring for an additional 15 minutes. Thereafter the stirring was continued and the temperature of the mixture maintained at room temperature overnight. Following the reaction period, the silver iodide was removed from the reaction mixture by filtration and the methanol filtrate evaporated to dryness to obtain the crystalline solid residue. This crystalline solid residue was dissolved in methanol-benzene, the solution decolorized with activated charcoal and the 1-methyl-1-allyl-4-(pentachlorophenyl)piperazinium chloride product precipitated from the decolorized solution. This product was recrystallized from methanolbenzene and the recrystallized 1-methyl-1-allyl-4-(pentachlorophenyl)piperazinium chloride product found to melt at 257.5°–258° C.

The following compounds of the present invention are prepared in accordance with the methods set forth in this specification.

1 - methyl - 1 - (4 - hydroxybutyl) - 4 - (pentachlorophenyl)piperazinium acetate (molecular weight 480.6) by reacting acetic acid with 1-methyl-1-(4-hydroxylbutyl)-4-(pentachlorophenyl)piperazinium hydroxide.

1,1 - dimethyl - 4 - (pentachlorophenyl)piperazinium nitrate (molecular weight 425.4) by reacting nitric acid with 1,1-dimethyl-4-(pentachlorophenyl)piperazinium hydroxide.

1 - methyl - 1 - (2 - hydroxyethyl) - 4 - (pentachlorophenyl)piperazinium propionate (molecular weight 466.5) by reacting propionic acid with 1-methyl-1-(2-hydroxethyl) - 4 - (pentachlorophenyl)piperazinium hydroxide.

1 - methyl - 1 - (octadecyl) - 4 - (pentachlorophenyl) piperazinium acetate (molecular weight 520.7) by reacting acetic acid with 1 - methyl - 1 - (octadecyl)-4-(pentachlorophenyl)piperazinium hydroxide.

1 methyl - 1 - (cyanomethyl) - 4 - (pentachlorophenyl)piperazinium sulfate (molecular weight 494.5) by reacting silver sulfate with 1 - methyl - 1 - (cyanomethyl)-4-(pentachlorophenyl)piperazinium chloride.

1 - methyl - 1 - (4 - fluorobutyl) - 4 - pentachlorophenyl)piperazinium sulfate (molecular weight 504.6) by reacting silver sulfate and 1-methyl-1-(4-fluorobutyl) - 4-(pentacholorophenyl)piperazinium chloride.

1,1 - dimethyl - 4 - (pentachlorophenyl)piperazinium sulfate (molecular weight 459.5) by reacting silver sulfate with 1,1 - dimethyl - 4 - (pentachlorophenyl)piperazinium chloride.

The compounds of the present invention can be employed as the toxic constituent in compositions utilized for the killing and control of bacterial and fungal pests. In such usage, the compounds are combined with one or a plurality of adjuvants or helpers including water, organic solvents, petroleum oils and other liquid carriers, surface active dispersing agents and finely divided solids such as chalk, talc or bentonite. The compounds may also be employed in water-in-oil and oil-in-water emulsions.

In such operations, the toxicant compounds can be applied in an unmodified form or applied as a dust, spray or drench. In further operations, the toxicant compounds can be added to the pest's food supply or habitat in any form desired.

In representative operations, 1-methyl-1-hexyl-4-(pentachlorophenyl)piperazinium chloride, 1 - methyl - 1 - (2-fluoroethyl) - 4 - (pentachlorophenyl)piperazinium chloride, 1 - methyl - 1 - cyanomethyl - 4 - (pentachlorophenyl)piperazinium chloride, 1 - methyl - 1 - ethyl-4-(pentachlorophenyl)piperazinium chloride, 1 - methyl - 1 - (2-hydroxyethyl) - 4 - (pentachlorophenyl)piperazinium chloride, 1 - methyl - 1 - (2 - propynyl) - 4 - (pentachlorophenyl)piperazinium chloride, 1 - methyl - 1 - isopropyl-4-(pentachlorophenyl)piperazinium chloride or 1-methyl-1 - (ethylcarboxymethyl)-4-(pentachlorophenyl) - piperazinium chloride, each when employed in nutrient agar at a concentration of 500 parts per million by weight and as the sole toxic constituent gave 100 percent kill of *Bacillus subtilis* and *Staphylococcus aureaus*. In further, operations, 1,1-dimethyl-4-(pentachlorophenyl)piperazinium chlorobromoiodate, 1,1-dimethyl-4-(pentachlorophenyl)piperazinium dichloroiodate and 1,1-dimethyl-4-(pentachlorophenyl)piperazinium dichloroiodate and 1,1 - dimethyl-4 - (pentachlorophenyl)piperazinium tetrachloroiodate each when employed in nutrient agar at a concentration of 500 parts per million by weight and as the sole toxic constituent gave 100 percent kill and control of *Staphylococcus aureaus*, *Pseudomonas aeruginosa*, and *Candida pelliculosa*.

The 1-methyl - 4 - (pentachlorophenyl)piperazine compound employed as a starting material in the present invention is prepared in accordance with the method set forth in my copending applicaton, Ser. No. 598,893, now U.S. Patent 3,394,137, filed even date herewith.

I claim:

1. A member of the group of 1-methyl-1-(substituted)-4 - (pentachlorophenyl)piperazinium salts corresponding to one of the formulae

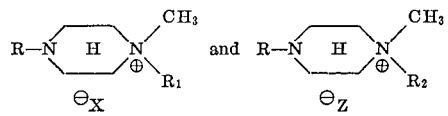

wherein R represents pentachlorophenyl, $R_1$ represents allyl or propynyl, $R_2$ represents 1 to 18 carbon atom alkyl, halolower alkyl, cyanomethyl, hydroxy lower alkyl, benzyl or (ethoxycarbonyl)methyl, X represents sulfate, nitrate, chloride, bromide, iodide or 1 to 4 carbon atom alkanoate, and Z represents X or bromochloroiodate, dichloroiodate, or tetrachloroiodate.

2. The compound claimed in claim 1 wherein the 1-methyl-1-(substituted) - 4 - (pentachlorophenyl)piperazinium salt is 1,1-dimethyl-4-(pentachlorophenyl)piperazinium chloride.

3. The compound claimed in claim 1 wherein the 1 - methyl - 1 - (substituted) - 4 - (pentachlorophenyl)piperazinium salt is 1-methyl - 1 - cyanomethyl-4-(pentachlorophenyl)piperazine chloride.

4. The compound claimed in claim 1 wherein the 1 - methyl - 1 - (substituted) - 4 - (pentachlorophenyl)piperazinium compound is 1,1-dimethyl-4-(pentachlorophenyl)piperazinium tetrachloroiodate.

5. The compound claimed in claim 1 wherein the 1 - methyl - 1 - (substituted) - 4 - (pentachlorophenyl)piperazinium compound is 1,1-dimethyl-4-(pentachlorophenyl)piperazinium bromochloroiodate.

References Cited

UNITED STATES PATENTS

| | | | |
|---|---|---|---|
| 2,807,617 | 9/1957 | Dalalian et al. | 260—268 |
| 2,830,056 | 4/1958 | Ruschig et al. | 260—268 |
| 2,909,524 | 10/1959 | Dalalian et al. | 260—268 |
| 2,918,464 | 12/1959 | Caldwell | 260—243 |
| 3,074,937 | 1/1963 | Cavallini | 260—268 X |
| 3,106,557 | 10/1963 | Poppelsdorf et al. | 260—268 |
| 3,279,981 | 10/1966 | Geiger et al. | 167—33 |
| 3,394,137 | 7/1968 | Morris | 260—268 |
| 3,402,039 | 9/1968 | Mussell et al. | 260—268 X |

DONALD G. DAUS, Primary Examiner

U.S. Cl. X.R.

260—652, 999